US008565100B2

(12) United States Patent
Jokimies et al.

(10) Patent No.: US 8,565,100 B2
(45) Date of Patent: *Oct. 22, 2013

(54) METHOD AND APPARATUS FOR FACILITATING MACHINE-TYPE COMMUNICATION

(75) Inventors: Matti Kullervo Jokimies, Salo (FI); Gilles Charbit, Farnborrough (GB)

(73) Assignee: Renesas Mobile Corporation, Tokyo (JP)

( * ) Notice: Subject to any disclaimer, the term of this patent is extended or adjusted under 35 U.S.C. 154(b) by 217 days.

This patent is subject to a terminal disclaimer.

(21) Appl. No.: 13/069,765

(22) Filed: Mar. 23, 2011

(65) Prior Publication Data

US 2012/0243422 A1    Sep. 27, 2012

(51) Int. Cl.
*H04W 4/06* (2009.01)
*H04W 52/02* (2009.01)
*H04W 24/00* (2009.01)

(52) U.S. Cl.
USPC .......................... 370/242; 370/328; 370/311

(58) Field of Classification Search
USPC .................. 370/242, 328, 311, 216, 312, 401
See application file for complete search history.

(56) References Cited

U.S. PATENT DOCUMENTS

| 2008/0153521 | A1 | 6/2008 | Benaouda et al. | |
| 2011/0128911 | A1 | 6/2011 | Shaheen | |
| 2012/0030358 | A1* | 2/2012 | Mackenzie | 709/226 |
| 2012/0039313 | A1* | 2/2012 | Jain | 370/338 |
| 2012/0040700 | A1* | 2/2012 | Gomes et al. | 455/500 |
| 2012/0184205 | A1* | 7/2012 | Luft et al. | 455/9 |

FOREIGN PATENT DOCUMENTS

WO    WO 2010/054471    5/2010
WO    WO 2010/149115    12/2010

OTHER PUBLICATIONS

Ghadialy, Zahid. Network improvements for Machine Type Communications (NIMTC). 3G and 4G Wireless Blog. [online], [retrieved on Nov. 7, 2011]. Retrieved from the Internet <URL: http://324g.blogspot.com/2010/10/network-improvements-for-machine-type.html>.

Combined Search and Examination Report for UK Application No. GB1104871.7 dated Apr. 1, 2011.

"Technical Specification Group Services and System Aspects; Study on Enhancements for MTC (Release 11)" [online]. Retrieved from the Internet: <http://www.3gpp.org/ftp/specs/html-info/22888.htm>. 19 pages.

"Technical Specification Group Services and System Aspects; Study on Enhancements for MTC (Release 10)" [online]. Retrieved from the Internet: <http://www.3gpp.org/ftp/Specs/archive/22_series/22.368/22368-a00.zip>. 27 pages.

(Continued)

*Primary Examiner* — Brian D Nguyen
(74) *Attorney, Agent, or Firm* — Alston & Bird LLP

(57) ABSTRACT

A method and apparatus are provided to facilitate communications with MTC devices. An apparatus may include processing circuitry configured at least to receive a broadcasted triggering message and to determine whether the triggering message identifies a machine-type communication (MTC) gateway or another device within a capillary network supported by the MTC gateway. The processing circuitry may cause at least a portion of the triggering message to be provided to a device within the capillary network in an instance in which the triggering message identifies the device within the capillary network. The processing circuitry may also be configured to determine an action requested by the triggering message in an instance in which the triggering message identifies the MTC gateway.

20 Claims, 6 Drawing Sheets

(56) References Cited

OTHER PUBLICATIONS

Reports and Notes from 3GPP TSG SA WG2 Meeting #78. San Francisco, CA, USA. Feb. 22-26, 2010. 15 pages.

Reports and Notes from 3GPP TSG SA WG2 Meeting #79. Kyoto, JP. May 10-15, 2010. 2 pages.
Change Request from 3GPP TSG SA WG2 Meeting #77. Shenzen, CN. Jan. 18-22, 2010. 4 pages.

* cited by examiner

METHOD AND APPARATUS FOR FACILITATING MACHINE-TYPE COMMUNICATION

TECHNOLOGICAL FIELD

Embodiments of the present invention relate generally to methods and apparatus for facilitating machine-type communications (MTC) and, more particularly, to methods and apparatus for facilitating communications between a network and an MTC device in an offline or other detached mode.

BACKGROUND

Machine-to-machine (M2M) communications, also referred to as machine-type communications (MTC), is a type of communication that is anticipated to expand, potentially rapidly, in the near future. With MTC, machines may locally communicate directly with one another and, as such, may be employed for various applications including for smart homes, smart metering, fleet management, remote healthcare, access network operation management, etc.

In one MTC topology, an MTC gateway is provided that is configured to communicate with a network, such as a cellular network. The MTC gateway may also support a capillary network that includes one or more other MTC devices, also known as capillary network devices, that are configured communicate with the MTC gateway, but need not necessarily be configured to communicate with the network. The capillary network devices may be embodied in a number of different forms including, for example, an actuator, a display, a memory device or the like.

In order to reduce the signaling load upon the network, it may be desirable in some instances to reduce the amount of regular network signaling that is conducted with an MTC gateway or other capillary network device. Therefore, an MTC device, such as MTC gateway or another capillary network device, may be taken offline so as to be in an offline state or offline mode. In an offline mode, the MTC device is not in a typical idle mode, but is in a more detached mode in which the conventional location update signaling and conventional paging are not performed. However, in the offline mode, an MTC device may listen for trigger indications via, for example, a broadcast or paging channel during at least certain periods of time. In this regard, an MTC device may be configured to wake up in accordance with a predefined schedule in order to listen for and respond to trigger indications. By placing the MTC device in an offline mode in an instance in which the MTC device is not actively engaged in communications, however, the quantity of conventional signaling is reduced, thereby conserving network resources.

A triggering indication may disadvantageously require that a bidirectional connection be established between the MTC device, such as an MTC gateway, and the source of the triggering indication, such as an MTC server. In this regard, a bidirectional connection may be required in order to conduct the handshaking that may be required in order to authenticate the triggering indication. Unfortunately, the establishment of a bidirectional connection and the signaling conducted via the bidirectional connection may disadvantageously increase the network signaling.

Additionally, the addressing of the MTC gateways and the capillary network devices is hierarchical in that the addressing of an MTC gateway is separate and different than that of a capillary network device. While an MTC server may communicate, via a network such as a cellular network, with an MTC gateway, the MTC server may not generally communicate directly with a capillary node device. Instead, a message intended for the capillary network device is generally directed to the MTC gateway that supports the capillary network within which the capillary network device operates. The body of the message received by the MTC gateway may identify the capillary network device and may include the actual message that is intended for delivery to the capillary network device.

In some instances, however, the MTC devices may change roles such that a capillary network device may begin to serve as an MTC gateway, an MTC gateway may begin to serve as a capillary network device or, still further, either a capillary network device or an MTC gateway may begin to function as both a capillary network device and an MTC gateway. Because a network, such as a cellular network, is configured to specifically direct communications to an MTC gateway, but to not directly communicate with the other capillary network devices and further since the addressing associated with MTC gateways and the capillary network devices is different from one another, the network, such as a broadcast center, and/or the MTC server must be advised in an instance in which the MTC devices change roles to insure that subsequent communications are properly addressed and properly directed to a current MTC gateway. For example, the MTC server and a broadcast center may need to be informed of the change in roles of the MTC devices so that the network may thereafter properly address and construct messages intended for the MTC devices that are presently serving as MTC gateways. This updating and reconfiguration of an MTC server, a broadcast center or other network entity may disadvantageously increase the network signaling as well as the processing that is required of the network.

BRIEF SUMMARY

A method and apparatus are therefore provided according to example embodiments of the present invention in order to facilitate communications with MTC devices in a manner that is sensitive to network signaling and, in some embodiments, that conserves network signaling. For example, the apparatus and method of one embodiment may permit each MTC device, including each MTC gateway and each capillary network device, to be individually addressed which may, in turn, avoid instances in which an MTC server, a broadcast center or the like would have to be updated or otherwise reconfigured as the roles of the MTC devices change over time. Further, an apparatus and method according to one embodiment may reduce the size of the messages that are provided to the MTC devices and may reduce or eliminate the need for the establishment of a bidirectional communications link in order to authenticate the messages, thereby further conserving network signaling resources.

In one embodiment, an apparatus is provided that includes processing circuitry configured at least to receive a broadcasted triggering message and to determine whether the triggering message identifies a machine-type communication (MTC) gateway or another device within a capillary network supported by the MTC gateway. The processing circuitry of this embodiment is also configured to cause at least a portion of the triggering message to be provided to a device within the capillary network in an instance in which the triggering message identifies the device within the capillary network. For example, the processing circuitry may be configured to cause at least a portion of the triggering message to be provided to a device within the capillary network by performing protocol and address mapping to protocols and addresses of the capillary network. The processing circuitry of this embodiment is also configured to determine an action requested by the triggering message in an instance in which the triggering message identifies the MTC gateway.

The processing circuitry of one embodiment is also configured to authenticate the triggering message based upon an authentication field of the triggering message. The processing circuitry may also be configured to determine whether the triggering message identifies an MTC gateway or another capillary network device based upon an abbreviated device identity included within the triggering message. The abbreviated device identity of this embodiment uniquely identifies the MTC gateway or another capillary network device within a geographic area in which the MTC gateway operates, but not outside of the geographic area.

The processing circuitry of one embodiment is also configured to determine whether an indication of a failure to receive is received from another MTC gateway in an instance in which the triggering message identifies the another MTC gateway. In this embodiment, the processing circuitry may also be configured to cause at least a portion of the triggering message to be provided to the another MTC gateway in an instance in which the indication of a failure to receive is determined to have been received. The processing circuitry may also be configured to direct a receiver to wake up in accordance with a predefined schedule in order to receive the broadcasted triggering message.

In another embodiment, a method is provided that includes receiving a broadcasted triggering message and determining, with processing circuitry, whether the triggering message identifies a machine-type communication (MTC) gateway or another device within a capillary network supported by the MTC gateway. The method of this embodiment also causes at least a portion of the triggering message to be provided to a device within the capillary network in an instance in which the triggering message identifies the device within the capillary network. For example, causing at least a portion of the triggering message to be provided to a device within the capillary network may include performing protocol and address mapping to protocols and addresses of the capillary network. The method of this embodiment also includes determining an action requested by the triggering message in an instance in which the triggering message identifies the MTC gateway.

The method may also authenticate the triggering message based upon an authentication field of the triggering message. The method of one embodiment may determine whether the triggering message identifies an MTC gateway or another capillary network device by determining whether the triggering message identifies an MTC gateway or another capillary network device based upon an abbreviated device identity included with the triggering message. In this regard, the abbreviated device identity uniquely identifies the MTC gateway or another capillary network device within the geographic area in which the MTC gateway operates, but not outside of the geographic area.

The method of one embodiment also determines whether an indication of a failure to receive is received from another MTC gateway in an instance in which the triggering message identifies the another MTC gateway. In this embodiment, the message may also cause at least a portion of the triggering message to be provided to the another MTC gateway in an instance in which the indication of a failure to receive is determined to have been received. The method of one embodiment may also direct a receiver to wake up in accordance with a predefined schedule in order to receive a broadcasted triggering message.

In a further embodiment, an apparatus is provided that includes processing circuitry configured at least to receive a geographical target area message providing a first device identity, a target area and wake up information. The target area may correspond to respective locations of each machine-type communication (MTC) gateway that supports a respective capillary network. The processing circuitry of this embodiment is also configured to subsequently receive a trigger information message having the first device identity, an abbreviated device identity that is shorter than the first device identity, and a requested action. The processing circuitry of this embodiment is also configured to cause a triggering message to be broadcast within the target area in accordance with the wake up information. The triggering message may include the abbreviated device identity and the requested action.

The processing circuitry of one embodiment is further configured to determine one or more base stations that communicate within the target area such that the processing circuitry may be configured to cause a triggering message to be broadcast by causing the one or more base stations to broadcast the triggering message within the target area. The processing circuitry of one embodiment is also configured to remove the first device identity from the trigger information message prior to causing the triggering message to be broadcast without the first device identity.

The processing circuitry of one embodiment is also configured to receive the trigger information message by receiving the trigger information message that also has an authentication field. In this embodiment, the processing circuitry may also be configured to cause the triggering message to be broadcast by causing the triggering message to be broadcast that also includes the authentication field. The first device identity and the abbreviated device identity may be configured to identify any one of an MTC gateway or another device within the capillary network supported by the MTC gateway.

In yet another embodiment, an apparatus is provided that includes processing circuitry configured at least to cause a geographical target area message to be provided that includes a first device identity, a target area and wake up information. In this embodiment, the target area may correspond to respective locations of each machine-type communication (MTC) gateway that supports a respective capillary network. The processing circuitry of this embodiment is also configured to subsequently cause a trigger information message to be provided that includes first device identity, an abbreviated device identity that is shorter than the first device identity and a requested action.

The processing circuitry of one embodiment may be configured to cause the trigger information message to be provided by causing the trigger information message to be provided that also includes an authentication field. In one embodiment, the first device identity and the abbreviated device identity are configured to identify any one of an MTC gateway or another device within a capillary network supported by the MTC gateway.

BRIEF DESCRIPTION OF THE SEVERAL VIEWS OF THE DRAWINGS

Figure 1:
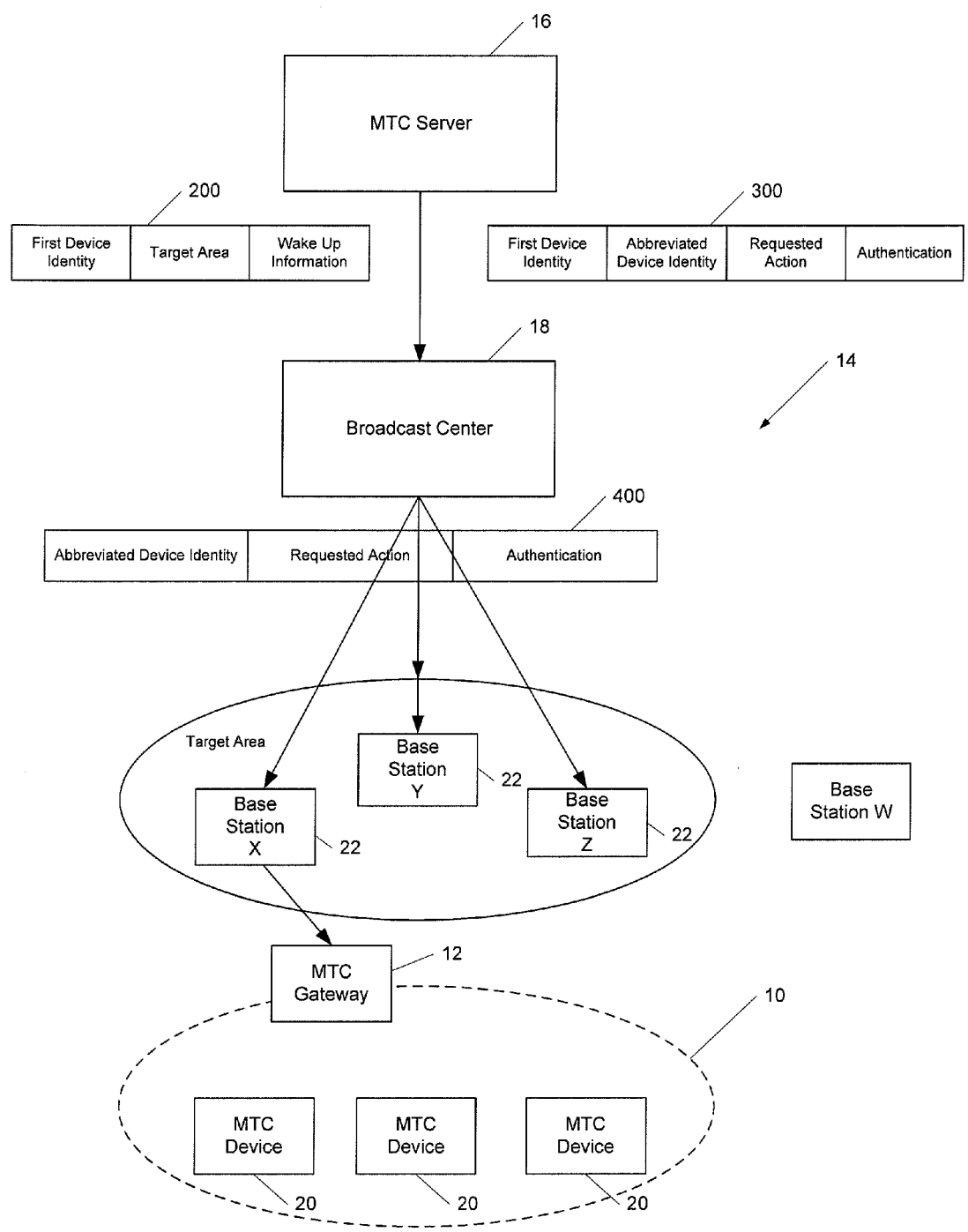
Figure 2:
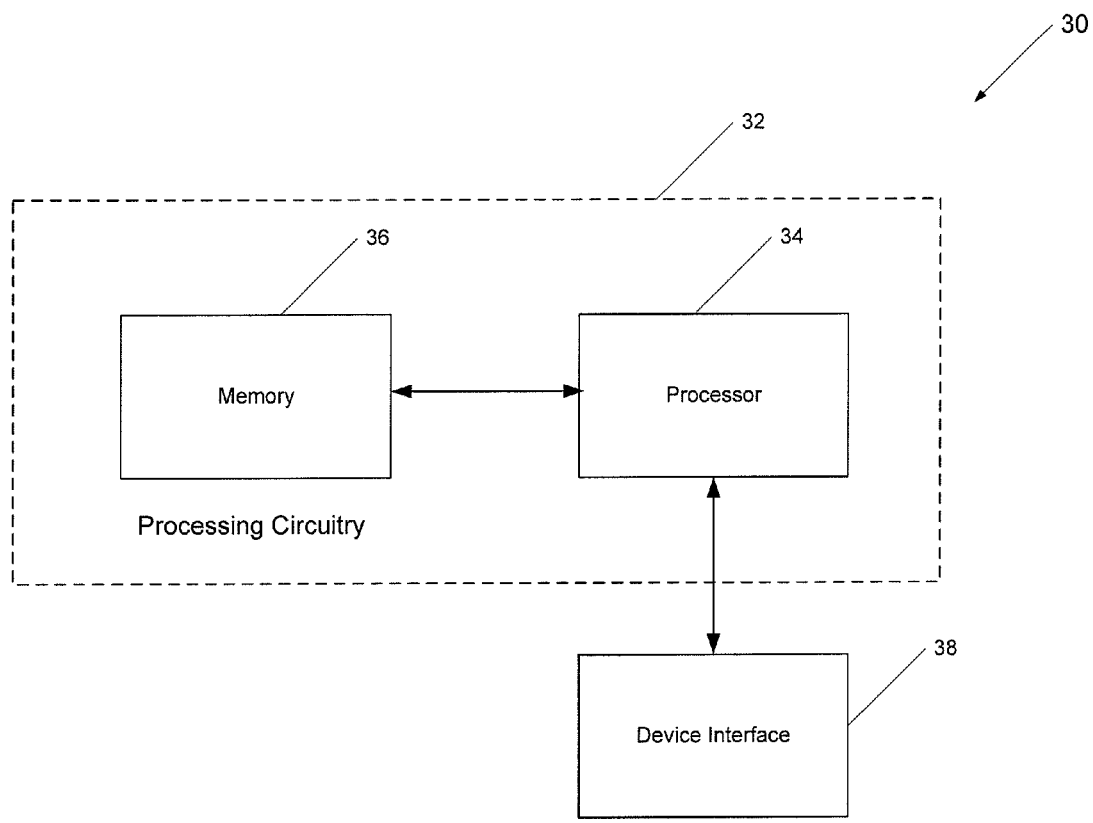
Figure 3:
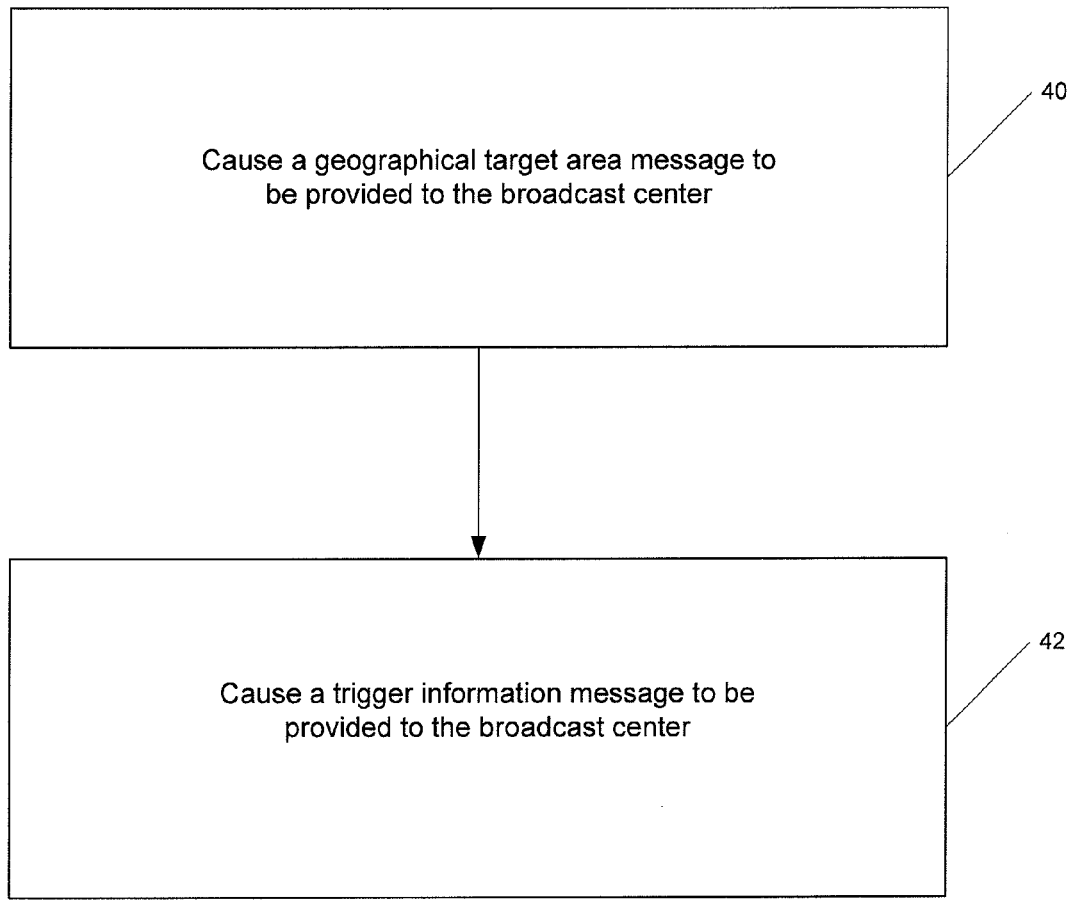
Figure 4:
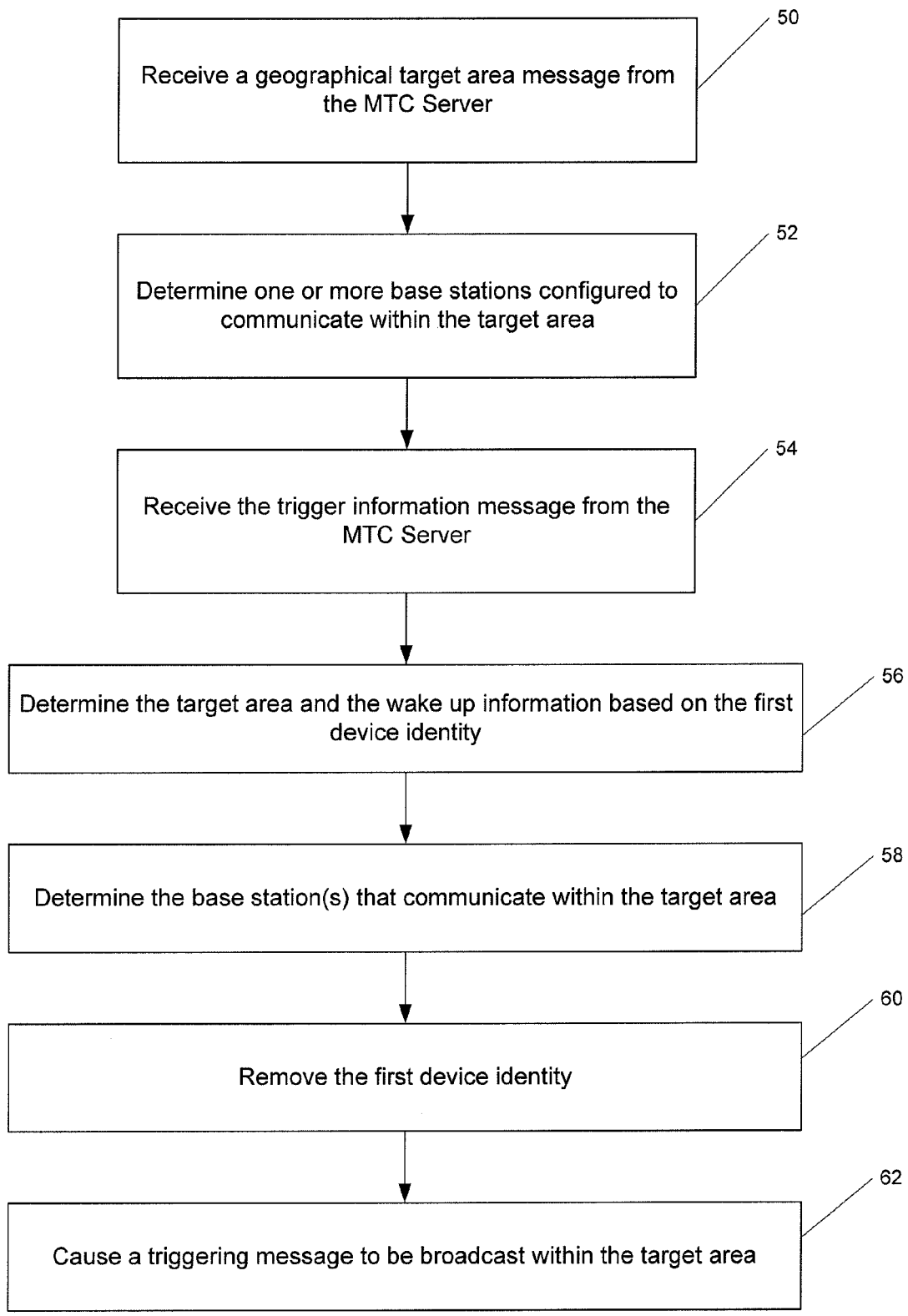
Figure 5:
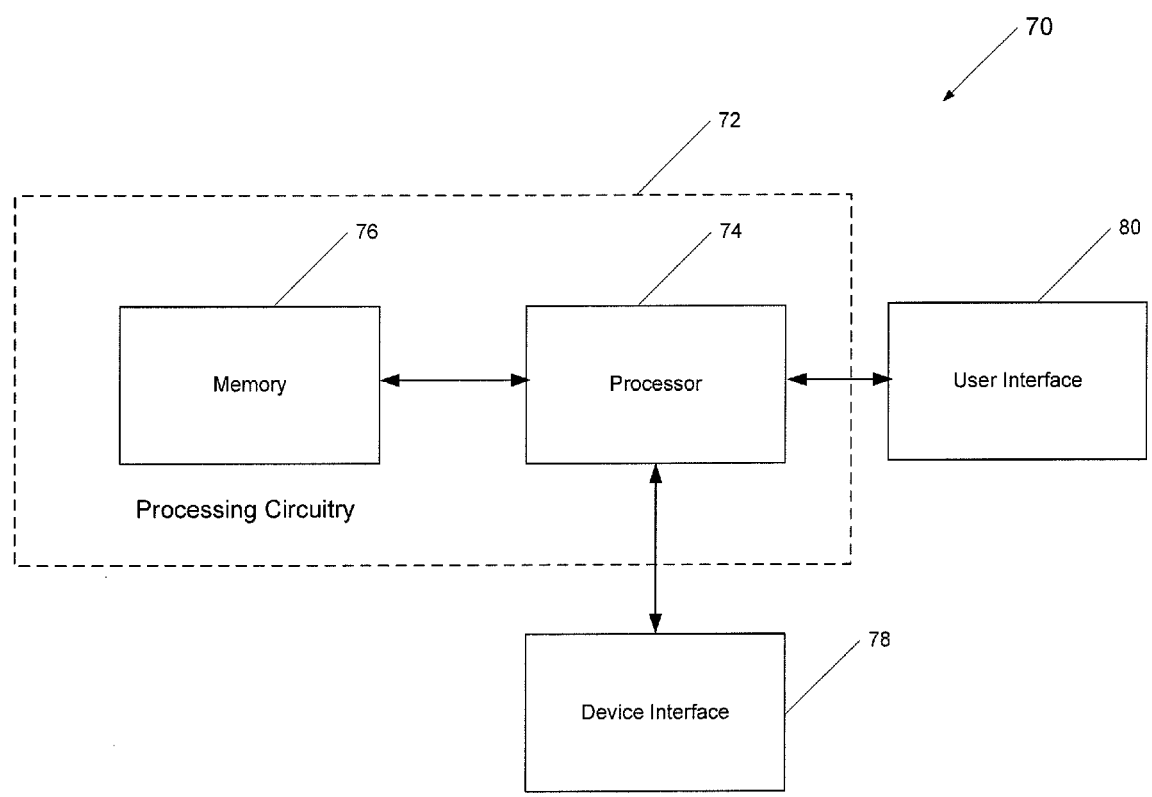
Figure 6:
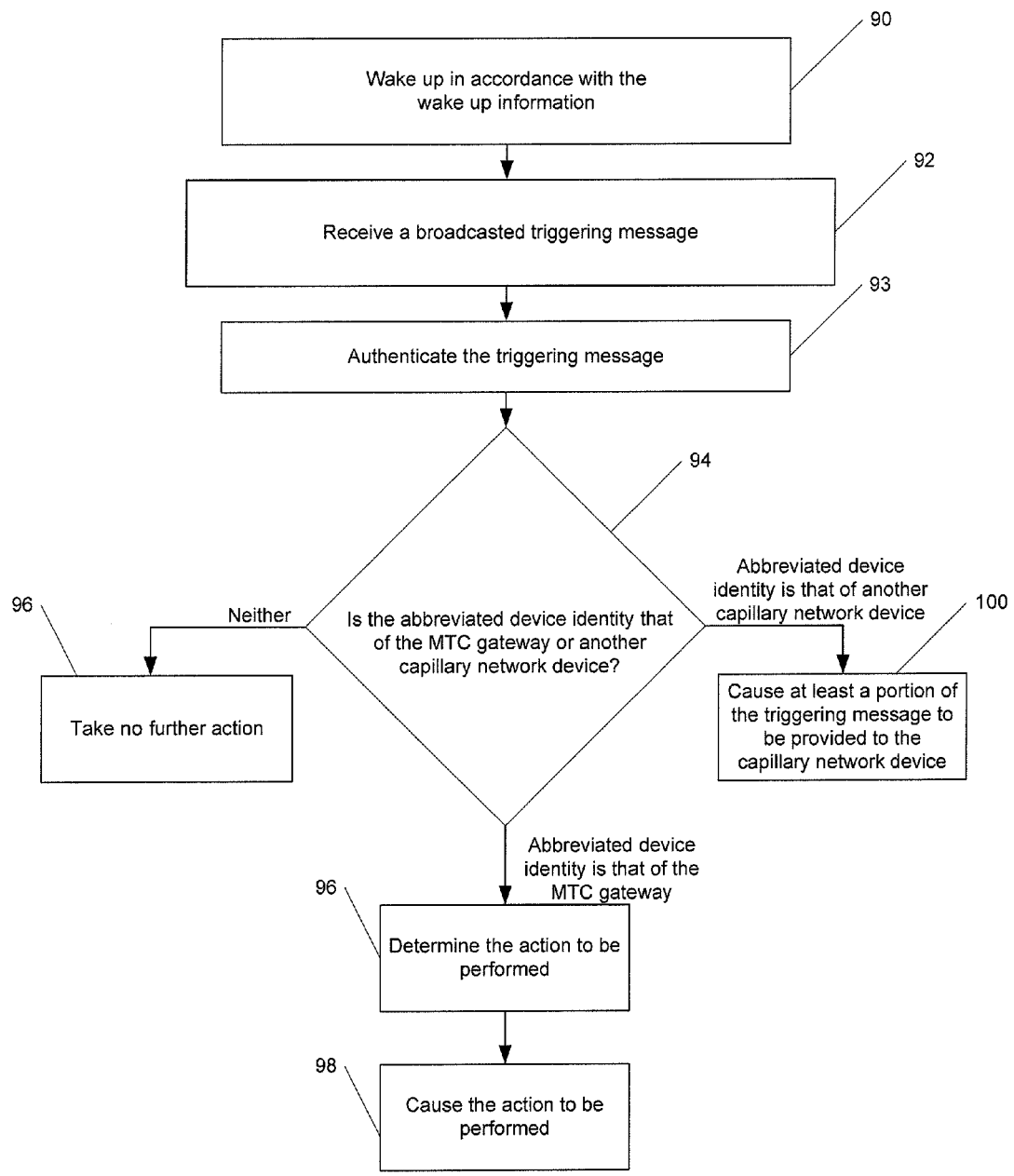

Having thus described embodiments of the invention in general terms, reference will now be made to the accompanying drawings, which are not necessarily drawn to scale, and wherein:

FIG. 1 is one example of a communication system according to an embodiment of the present invention;

FIG. 2 is a block diagram of an apparatus from the perspective of an MTC server, a broadcast center or a base station in accordance with an example embodiment of the present invention;

FIG. 3 is a flow chart illustrating operations performed by an apparatus, such as an MTC server, in accordance with an example embodiment of the present invention;

FIG. 4 is a flow chart illustrating operations performed by an apparatus, such as a broadcast center, in accordance with an example embodiment of the present invention;

FIG. 5 is a block diagram of an apparatus from the perspective of an MTC gateway in accordance with an example embodiment of the present invention; and FIG. 6 is a flow chart illustrating operations performed by an apparatus, such as an MTC gateway, in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A method and apparatus are provided for facilitating network communications with an MTC device, such as an MTC device in an offline or other detached mode. In this regard, the network communications with MTC devices may be supported by any of a variety of different systems, including, for example, the system of FIG. 1 in which a method, apparatus and computer program product of an example embodiment of the present invention may be implemented. As shown in FIG. 1, a system in accordance with an example embodiment of the present invention may include a capillary network 10 including at least one MTC gateway 12 that is in communication with a network 14. The network may be any of various cellular or mobile networks or public land mobile networks (PLMNs) configured in accordance with any of a number of different protocols including long-term evolution (LTE), LTE-Advanced (LTE-A), wideband code division multiple access (W-CDMA), CDMA 2000, global system for mobile communications (GSM), general packet radio service (GPRS) and the like. The network may include a collection of various different nodes, devices or functions that may be in communication with each other via corresponding wired and/or wireless interfaces. As such, the illustration of FIG. 1 should be understood to be an example of a broad view of certain elements of a system and not an all-inclusive or detailed view of the system or the network.

As shown in FIG. 1, however, the system may include an MTC server 16. The MTC server may be any of various platforms such as a dedicated server, backend server, or server bank associated with a particular information source, function or service. As described below, the MTC server is designed to configure a broadcast center 18 for subsequent communications with the MTC devices, such as the MTC gateway 12 and other capillary network devices 20. Additionally, the MTC server is configured to provide, transmit or otherwise act as a source of messages to the MTC devices. In one embodiment in which the network 14 is a cellular network, such as a 3GPP network, the MTC server may be outside of the cellular network, even though the MTC server may be within the domain of the cellular operator.

The network 14 may include a broadcast center 18 configured to deliver broadcast messages that are to be transmitted over the network, such as a cellular network. In a 3GPP network, the cell broadcast center and/or the operation and maintenance center may serve as a broadcast center for delivering broadcast information over the network. In addition to the broadcast center, the network may include a plurality of base stations 22, such as node Bs, evolved node Bs (eNBs), or other base stations or access points (hereinafter generically referenced as "base stations"). As shown in FIG. 1, the base stations are in communication with the broadcast center for broadcasting the information provided by the broadcast center in proximity to the respective base stations.

As also shown in FIG. 1, a capillary network 10 including at least one MTC gateway 12 is in communication with the network 14, such as by being in communication with one or more of the base stations 22. A capillary network includes one or more MTC devices that are configured to communicate directly with one another via MTC. A capillary network may include at least one MTC device that functions as an MTC gateway for communicating with the network, such as one or more of the base stations. The capillary network may also include one or more capillary network devices 20 that are configured to communicate with one another and with the MTC gateway via MTC, but are not configured to directly communicate with the network. The capillary network devices may be embodied in a number of different forms including, for example, an actuator, a sensor, a display, a memory device or the like. Although not shown in the embodiment of FIG. 1, the capillary network may include two or more MTC gateways that are each configured to communicate with the network as well as the other capillary network devices. Also, in some embodiments, one or more of the MTC devices may function concurrently as both an MTC gateway and a capillary network device.

In order to reduce the signaling required to be supported by the network 14 for the benefit of the MTC devices, the MTC devices may be configured to go offline or otherwise enter a detached mode in instances in which the MTC devices are not actively communicating. By entering an offline or other detached mode, the MTC devices do not require or otherwise participate in the conventional location update signaling, conventional paging, etc. However, an MTC gateway 12 is configured to wake up and to monitor the broadcast messages for messages directed to the MTC gateway or to the other capillary network devices 20. As such, the network, such as the MTC server 16, the broadcast center 18 or the like may communicate with an MTC gateway and, in turn, the other capillary network devices, albeit in a manner that conserves the signaling bandwidth of the network.

The MTC server 16, broadcast center 18 or base stations 22 may be configured in various manners, but, in one embodiment, may be embodied as or otherwise include an apparatus 30 as generically represented by the block diagram of FIG. 2. While the apparatus may be employed, for example, by an MTC server, broadcast center, a base station or the like, it should be noted that the components, devices or elements described below may not be mandatory and thus some may be amended in certain embodiments. Additionally, some embodiments may include further or different components, devices or elements beyond those shown and described herein.

As shown in FIG. 2, the apparatus 30 may include or otherwise be in communication with processing circuitry 32 that is configurable to perform actions in accordance with example embodiments of the MTC server 16, broadcast center 18 or base stations 22 described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 32 may include a processor 34 and memory 36 that may be in communication with or otherwise control a device interface 38. As such, the processing circuitry may be embodied as a circuit chip (e.g., an integrated circuit chip) configured (e.g., with hardware, software or a combination of hardware and software) to perform operations described herein. However, in some embodiments taken in the context of a MTC server, broadcast center or base station, the processing circuitry may be embodied as a portion of the MTC server, broadcast center or base station.

The device interface 38 may include one or more interface mechanisms for enabling communication with other devices and/or networks. In some cases, the device interface may be any means such as a device or circuitry embodied in either hardware, or a combination of hardware and software that is configured to receive and/or transmit data from/to the network 14 and/or any other device or module in communication with the processing circuitry 32. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 36 may include one or more non-transitory memory devices such as, for example, volatile and/or non-volatile memory that may be either fixed or removable. The memory may be configured to store information, data, applications, instructions or the like for enabling the apparatus 30 to carry out various functions in accordance with example embodiments of the present invention. For example, the memory could be configured to buffer input data for processing by the processor 34. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 34 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 36 or otherwise accessible to the processor. As such, whether configured by hardware or by a combination of hardware and software, the processor may represent an entity (e.g., physically embodied in circuitry—in the form of processing circuitry 32) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

As described below, the MTC server 16 is generally configured to provide messages directed to a MTC device that requests that the MTC device performs a particular action. Prior to providing the messages directed to the MTC device requesting the performance of a particular action, the MTC server may communicate with the broadcast center 18 so as to provide the broadcast center with information regarding the respective MTC device. Thereafter, when the MTC server provides the message directed to the MTC device, the broadcast center may be configured to appropriately deliver the message to the MTC device via the network 14, such as via one or more base stations 22, based upon the information previously provided by the MTC server regarding the respective MTC device.

As shown in block 40 of FIG. 3 and in FIG. 1, for example, the MTC server 16 may include means, such as the processing circuitry 32, processor 34, device interface 38 or the like, for causing a geographical target area message 200 to be provided to the broadcast center 18. The geographical target area message may include a first device identity, a target area and wake up information. The first device identity may be the full device identity of a respective MTC device. In this regard, the first device identity uniquely identifies the MTC device relative to all other MTC devices, such as all other MTC devices served by the network 14. The target area corresponds to the locations of all possible serving MTC gateways 12 for the MTC device identified by the first device identity. Thus, each MTC device that may serve as an MTC gateway for the capillary network 10 of which the respective MTC device identified by the full device identity is associated or is a member may be identified as a possible serving MTC gateway. In this regard, the MTC server may be configured to obtain the identity of all possible serving MTC gateways during an initial pairing of the MTC gateways to a capillary network and may correspondingly obtain the locations of the possible serving MTC gateways. This pairing of the MTC gateways to a capillary network may then be repeated over the course of time. As to the wake up information, the MTC server may provide the broadcast center with wake up information that identifies the times at which the MTC gateways for the capillary network that supports the MTC device that is identified by the first device identity wake up as well as the window of time during which the MTC gateways will remain awake for receiving broadcast messages directed thereto or to other capillary network devices. The timing associated with the wake up information may be provided in various manners including as a common clock reference or otherwise, such as based upon the system frame number, a global positioning system (GPS) reference signal or the like.

As shown in block 50 of FIG. 4 which illustrates the operations performed by the broadcast center 18, the broadcast center 18 includes means, such as the processing circuitry 32, the processor 34, the device interface 38 or the like, for receiving the geographical target area message 200 from the MTC server 16. As described above, the geographical target area message generally includes the first device identity, the target area and the wake up information. The broadcast center may store the geographical target area message and/or may separately store the information provided by the different fields of the geographical target area message. Based upon the target area, the broadcast center may also include means, such as the processing circuitry, the processor or the like, for determining one or more base stations 22 that are configured to communicate within the target area. See block 52. In the embodiment illustrated in FIG. 1, for example, the broadcast center may determine that base station X, base station Y and base station Z are configured to communicate within the target area, but base station W may be configured to communicate in some other region outside of the target area. The broadcast center may be configured to determine the base stations that are configured to communicate within the target area in various manners. In one embodiment, however, the broadcast center includes or is able to access information that defines the geographic region in which each base station is configured to communicate such that the broadcast center, such as the processing circuitry, the processor or the like, is thereafter able to determine those base stations having broadcast regions that overlap with the target area.

The MTC server 16 may provide a broadcast center 18 with geographical target area messages 200 for each of a plurality of different MTC devices including each of the MTC devices with which the MTC server may wish to subsequently communicate such as to request performance of a particular action. The MTC server need not provide geographical target area messages to configure the broadcast center with respect to each of the MTC devices at the same time, but may do so over the course of time. In any event, however, the MTC server generally provides the geographical target area message to the broadcast center prior to attempting to direct a message to the respective MTC device with an intent to cause the MTC device to perform a particular action.

Once the MTC server 16 has appropriately configured the broadcast center 18 via the geographical target area messages 200, the MTC server may cause a trigger information message 300 to be provided to the broadcast center, as shown in FIG. 1. As shown in block 42 of FIG. 3, the MTC server may include means, such as the processing circuitry 32, the processor 34, the device interface 38 or the like, for causing the trigger information message to be provided by the broadcast center. The trigger information message may include a first device identity, an abbreviated device identity and a requested action. The abbreviated device identity is shorter than the first device identity, such as being comprised of fewer bits than the first device identity. While the first device identity may uniquely identify the respective MTC device relative to all other MTC devices, such as all other MTC devices supported by the network 14, the abbreviated device identity uniquely identifies the respective MTC device within the target area in one embodiment or within the target area and a neighboring region about the target area in another embodiment. However, the abbreviated device identity need not uniquely identify the MTC device relative to all other MTC devices, such as all other MTC devices supported by the network outside of the target area or outside of the target area and a surrounding neighboring area. Thus, two or more MTC devices that have different first device identities may have the same abbreviated device identity so long as the MTC devices are in different target areas or are otherwise sufficiently spaced apart.

As shown in block 54 of FIG. 4, the broadcast center 18 correspondingly includes means, such as the processing circuitry 32, the processor 34, the device interface 38 or the like, for receiving a trigger information message 300 having the first device identity, the abbreviated device identity and the requested action from the MTC server 16. Based upon the full device identity of the trigger information message, the broadcast center may include means, such as the processing circuitry, the processor or the like, for determining the target area and the wake up information, such as wake up times and the wake up window, associated with the MTC device having the first device identity. See block 56. Moreover, based upon the target area, the broadcast center may include means, such as the processing circuitry, the processor, or the like, for determining the base station(s) 22 that communicate within the target area. See block 58. As the MTC device may be uniquely identified within the target area by the abbreviated device identity, the broadcast center may also include means, such as the processing circuitry, the processor, or the like, for removing the first device identity. See block 58.

As shown in block 62 of FIG. 4 and in FIG. 1, the broadcast center 18 may include means, such as the processing circuitry 32, the processor 34, the device interface 38 or the like, for causing a triggering message 400 to be broadcast within the target area in accordance with the wake up information. In this regard, the broadcast center may cause the triggering message to be transmitted to the base stations 22 that were previously determined to communicate within the target area, such as base stations X, Y and Z, but not base stations outside of the target area, such as base station W. The triggering message transmitted by the broadcast center to the base stations within the target area may, in turn, direct the base stations to broadcast the triggering message. As noted above, the broadcast center is configured to cause the triggering message to be broadcast in accordance with the wake up information associated with the respective MTC device, such as during a time period at which the respective MTC device is scheduled to be receiving broadcast messages. For example, the broadcast center may be configured to cause the triggering message to be broadcast within a wake up window following a predefined wake up time associated with the respective MTC device. The triggering message may be repeated within the wake up window, in order to increase the probability of correct reception of the message in the MTC device.

As shown in FIG. 1, the triggering message 400 that is caused to be broadcast by the broadcast center 18 may include the abbreviated device identity and the requested action. However, the triggering message generally does not include the first device identity which may have been removed by the broadcast center as described above. As such, the triggering message that is broadcast by the broadcast center and, in turn, the base stations 22 within the target area may be smaller than if it had included the first device identity. Thus, the composition of the triggering message may serve to reduce the signaling load upon the network 14, while still uniquely identifying the respective MTC device within the target area.

In order to permit the MTC device to authenticate the triggering message 400 without initiating a bidirectional network connection, such as for handshaking or the like, the geographical target area message 200 that is generated by the MTC server 16 and caused to be provided to the broadcast center 18 may also include an authentication field, as shown in FIG. 1. The authentication field may be generated in any number of different manners. For example, both the MTC server and the MTC device may know one or more predefined keys and a number that changes in a predefined manner, such as in an incremental manner, and which may define, for example, the number of the message. As such, the MTC server, such as the processing circuitry 34, the processor 32 or the like, may implement a one-way function that receives the trigger information message 300, albeit without the authentication field, one or more predefined keys and the number. The MTC server, such as the processing circuitry, the processor or the like, may generate a message authentication code as an output of the one-way function and the message authentication code may be appended to the trigger information message as the authentication field. The trigger information message including the authentication field may then be provided to the broadcast center which, in turn, causes the base stations 22 within the target area to broadcast the triggering message including the same authentication field. Typically, neither the broadcast center nor the base stations endeavors to authenticate the trigger information message so that the triggering and security mechanisms included therein are transparent to the network. Additionally, the base stations need not be aware of the MTC devices such that embodiments of the present invention are backwards compatible.

Upon receipt of triggering message 400, the MTC device, as described below, may implement the same authentication process, such as by means of a one-way function implemented by its processing circuitry, the processor or the like, in order to authenticate the triggering message. In this regard, the MTC device may provide the triggering message, albeit without the authentication field, the one or more keys and the number to the one-way function which, in turn, produces a message authentication code. If the message authentication code generated by the MTC device matches the message authentication code included in the authentication field of the triggering message, the triggering message may be authenticated. Alternatively, if the message authentication code generated by the MTC device differs from that included in the authentication field of the triggering message, the message may be rejected.

The MTC device, such as an MTC gateway 12, may be configured in various manners, but, in one embodiment, may be embodied as or otherwise include an apparatus 70 as generically represented by the block diagram of FIG. 5. While the apparatus may be employed, for example, by an MTC device, such as an actuator, a display, a memory device or other device configured for MTC, it should be noted that the components, devices or elements described below may not be mandatory and thus some may be amended in certain embodiments. Additionally, some embodiments may include further or different components, devices or elements beyond those shown and described herein.

As shown in FIG. 5, the apparatus 70 may include or otherwise be in communication with processing circuitry 72 that is configurable to perform actions in accordance with example embodiments of the MTC device described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 72 may include a processor 74 and memory 76 that may be in communication with or otherwise control a device interface 78 and, in some cases, a user interface 80. As such, the processing circuitry may be embodied as a circuit chip (e.g., an integrated circuit chip) configured (e.g., with hardware, software or a combination of hardware and software) to perform operations described herein. However, in some embodiments taken in the context of an MTC device, the processing circuitry may be embodied as a portion of MTC device itself.

The user interface 80 (if implemented) may be in communication with the processing circuitry 72 to receive an indication of a user input at the user interface and/or to provide an audible, visual, mechanical or other output to the user. The device interface 78 may include one or more interface mechanisms for enabling communication with other devices, such as other MTC devices, via MTC. In instances in which the MTC device is an MTC gateway 12, the device interface may also include one or more interface mechanisms for enabling communication with the network 14, such as via the base stations 22. In some cases, the device interface may be any means such as a device or circuitry embodied in either hardware, or a combination of hardware and software that is configured to receive and/or transmit data from/to the network 14 and/or any other device or module, such as other MTC devices, in communication with the processing circuitry 72. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 76 may include one or more non-transitory memory devices such as, for example, volatile and/or non-volatile memory that may be either fixed or removable. The memory may be configured to store information, data, applications, instructions or the like for enabling the apparatus 70 to carry out various functions in accordance with example embodiments of the present invention. For example, the memory could be configured to buffer input data for processing by the processor 74. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 74 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 76 or otherwise accessible to the processor. As such, whether configured by hardware or by a combination of hardware and software, the processor may represent an entity (e.g., physically embodied in circuitry—in the form of processing circuitry 72) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Referring now to FIG. 6, the operations of an MTC device, such as an MTC gateway 12, in accordance with one embodiment of the present invention, are shown. As described above, the MTC device may be configured to be offline, such as in an offline mode or a detached mode, in instances in which the MTC device is not actively communicating via the network 14. In this offline mode, the MTC device may include means, such as the processing circuitry 72, the processor 74, the device interface 78 or the like, for causing the device to wake up and to monitor the network for messages directed to the MTC gateway or to other capillary network devices 20 within the capillary network 10 supported by the MTC gateway. See block 90 of FIG. 6. As described above, the MTC device may be configured to wake up in accordance with a predefined schedule, such as at a predefined time, and to remain awake and to monitor messages broadcast via the network for a predefined period of time, that is, during a predefined wake up window of time. As shown in block 92 of FIG. 6, the MTC device may include means, such as the device interface, the processing circuitry, the processor or the like, for receiving a broadcasted triggering message 400, such as from any one of the base stations 22 that are configured to communicate within the target area of the capillary network. The MTC device may also include means, such as the processing circuitry, the processor, the device interface or the like, for determining whether the triggering message identifies the MTC gateway or another device within the capillary network supported by the MTC gateway. See block 94. For example, the triggering message may include an abbreviated device identity which uniquely identifies an MTC device within the target area. As such, the MTC gateway, such as the processing circuitry, the processor, the device interface or the like, may determine if the abbreviated device identity corresponds to that of the MTC gateway or any of the capillary network devices of the capillary network supported by the MTC gateway. For example, the MTC gateway, such as the memory 76 of the MTC gateway, may include a listing of the abbreviated device identities of the MTC gateway and the associated capillary network devices that is reviewed for purposes of comparison upon receipt of a triggering message.

In an instance in which the triggering message 400 does not identify the MTC gateway 12 or another capillary network device 20 associated with the MTC gateway, such as in an instance in which the abbreviated device identity of the triggering message does not match the abbreviated device identity of the MTC gateway or any of the associated capillary network devices, the MTC gateway may discard or ignores the triggering message since the triggering message is intended for another unrelated MTC device. See block 96 of FIG. 6. However, in an instance in which the MTC device does determine that the triggering message identifies either the MTC gateway or another capillary network device within the capillary network 10 supported by the MTC gateway, the MTC gateway is configured to take further action. In this regard, in an instance in which the triggering message identifies the MTC gateway itself, such as by means of including the abbreviated device identity of the MTC gateway, the MTC gateway may include means, such as the processing circuitry 72, the processor 70 or the like, for determining the action requested by the triggering message and then causing the action to be performed. See blocks 96 and 98. The triggering message may request the performance of a number of different actions including the establishment of a packet transfer connection, the performance of an offline data transfer, such as a relatively small offline data transfer, the transition to an online mode, such as by initially attaching to the network 14 and then remaining in an ordinary idle mode, or performing an action by or within the MTC device. By way of example, an action performed by or within the MTC device may include turning on or off a particular actuator, writing given control data to a device, such as the memory 76 of the MTC device with the data being included, for example, within the triggering message, or displaying data, such as data included within the triggering message.

Alternatively, in an instance in which the triggering message 400 identifies another device 20 within the capillary network 10 supported by the MTC gateway 12, the MTC gateway may include means, such as the processing circuitry 72, the processor 74, the device interface 78 or the like, for causing at least a portion of the triggering message to be provided to the capillary network device identified by the abbreviated device identity, such as by MTC. In conjunction with causing at least a portion of the triggering message to be provided to another capillary network device, such as in an instance in which the abbreviated device identity identifies another capillary network device as the intended recipient, the MTC gateway may include means, such as the processing circuitry, the processor, the device interface or the like, for performing protocol and address mapping from the protocols and addresses employed in the network communications to protocols and addresses of the capillary network device which supports MTC. The capillary network device that receives the triggering message or a portion thereof from the MTC gateway may then process the received portion of the triggering message and, in one embodiment, perform the requested action, such as described above in conjunction with the MTC gateway.

As described above and as shown in FIG. 1, the triggering message 400 may also include an authentication field. As such, the MTC device, such as the MTC gateway 12, may include, means, such as the processing circuitry 72, the processor 74 or the like, for authenticating the triggering message. See block 93 of FIG. 6. As described above, the MTC device, such as the processing circuitry, the processor or the like, may generate a message authentication code based upon the triggering message, albeit without the authentication field, and may then compare the message authentication code to the content of the authentication field in order to authenticate or reject the triggering message. As such, the MTC gateway of this embodiment may only perform the action requested by the triggering message or forward at least a portion of the triggering message to another capillary network device 20 in an instance in which the triggering message has been authenticated. By including an authentication code within the triggering message, the MTC gateway need not establish bidirectional communications with the network 14, thereby conserving network resources and, in one embodiment, permitting the MTC gateway to include a receiver, but not a transmitter, thereby simplifying the design of the MTC gateway and potentially reducing its cost.

While described above in conjunction with the receipt of a triggering message 400 by one MTC gateway 12, a triggering message may be received and potentially acted upon by a plurality of MTC gateways in an embodiment in which a capillary network 10 includes the plurality of MTC gateways. For example, a capillary network may include first and second MTC gateways. In response to a triggering message directed to an MTC device 20 within the capillary network, the first and second MTC gateways may each recognize the abbreviated device identity of the MTC device within the capillary network and one or both of the MTC gateways may provide the message to the MTC device, such as following authentication. Additionally, in response to a triggering message directed to the first MTC gateway, the first and second MTC gateways may each recognize the abbreviated device identity of the first MTC gateway. However, the second MTC gateway generally does not provide the triggering message to the first MTC gateway since the first MTC gateway would have also received the triggering message. However, in an instance in which the triggering message is not received by the first MTC gateway, such as due to a temporary failure in the link between the network 14 and the first MTC gateway, the first MTC gateway may advise the second MTC gateway of the network service interruption and the second MTC gateway may, in turn, provided the triggering message to the first MTC gateway.

In this regard, FIGS. 3, 4 and 6 are flowcharts of a system, method and program product according to example embodiments of the invention taken from the perspective of the MTC gateway 16, the broadcast device 18 and an MTC device, such as an MTC gateway 12, respectively. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified By configuring the MTC gateway 12 to recognize not only the abbreviated device identity associated within the MTC gateway, but also the abbreviated device identities of each of the MTC devices 20 within the capillary network 10 supported by the MTC gateway and by permitting the broadcast center 18 and, in turn, the base stations 22 within the target area to broadcast the triggering messages 400 to the MTC devices, the MTC devices may change roles, such as by changing from an MTC gateway to an capillary network device, by changing from a capillary network device to an MTC gateway, or by changing from either an MTC gateway or a capillary network device to a device that serves as both an MTC gateway and a capillary network device, without requiring updating or modification of the MTC server 12 and/or the broadcast center. The roles of the MTC devices may change for various reasons including, for example, traffic, congestion, relocation and temporary access limitations. Regardless of the reason for the change in role, the roles of the MTC devices may change in a dynamic fashion without affecting the communication between the network 14 and the MTC devices, even in instances in which the MTC devices are in an offline or detached mode.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising processing circuitry configured at least to:
   while offline, receive a broadcasted triggering message transmitted by a cell broadcast center via a base station with a target area;
   determine whether the triggering message identifies a machine type communication (MTC) gateway or another device within a capillary network supported by the MTC gateway;
   cause at least a portion of the triggering message to be provided to a device within the capillary network in an instance in which the triggering message identifies the device within the capillary network; and
   determine an action requested by the triggering message in an instance in which the triggering message identifies the MTC gateway.

2. An apparatus according to claim 1 wherein the processing circuitry is further configured to authenticate the triggering message based upon an authentication field of the triggering message.

3. An apparatus according to claim 1 wherein the processing circuitry is configured to determine whether the triggering message identifies a MTC gateway or another device based upon an abbreviated device identity included within the triggering message, and wherein the abbreviated device identity uniquely identifies the MTC gateway or another device within a geographic area in which the MTC gateway operates but not outside of the geographic area.

4. An apparatus according to claim 1 wherein the processing circuitry is configured to cause at least a portion of the triggering message to be provided to a device within the capillary network by performing protocol and address mapping to protocols and addresses of the capillary network.

5. An apparatus according to claim 1 wherein the processing circuitry is further configured to:
  determine whether an indication of a failure to receive is received from another MTC gateway in an instance in which the triggering message identifies the another MTC gateway; and
  cause at least a portion of the triggering message to be provided to the another MTC gateway in an instance in which the indication of a failure to receive is determined to have been received.

6. An apparatus according to claim 1 wherein the processing circuitry is further configured to direct a receiver to wake up in accordance with a predefined schedule in order to receive the broadcasted triggering message.

7. A message comprising:
  while offline, receiving a broadcasted triggering message transmitted by a cell broadcast center via a base station with a target area;
  determining, with a processing circuitry, whether the triggering message identifies a machine type communication (MTC) gateway or another device within a capillary network supported by the MTC gateway;
  causing at least a portion of the triggering message to be provided to a device within the capillary network in an instance in which the triggering message identifies the device within the capillary network; and
  determining an action requested by the triggering message in an instance in which the triggering message identifies the MTC gateway.

8. A method according to claim 7 further comprising authenticating the triggering message based upon an authentication field of the triggering message.

9. A method according to claim 7 wherein determining whether the triggering message identifies a MTC gateway or another device comprises determining whether the triggering message identifies a MTC gateway or another device based upon an abbreviated device identity included within the triggering message, and wherein the abbreviated device identity uniquely identifies the MTC gateway or another device within a geographic area in which the MTC gateway operates but not outside of the geographic area.

10. A method according to claim 7 wherein causing at least a portion of the triggering message to be provided to a device within the capillary network comprises performing protocol and address mapping to protocols and addresses of the capillary network.

11. A method according to claim 7 further comprising:
  determining whether an indication of a failure to receive is received from another MTC gateway in an instance in which the triggering message identifies the another MTC gateway; and
  causing at least a portion of the triggering message to be provided to the another MTC gateway in an instance in which the indication of a failure to receive is determined to have been received.

12. A method according to claim 7 further comprising directing a receiver to wake up in accordance with a predefined schedule in order to receive the broadcasted triggering message.

13. An apparatus comprising processing circuitry configured at least to:
  receive a geographical target area message providing a first device identity, an abbreviated device identity that is shorter than the first device identity, a target area and wake up information, wherein the target area corresponds to respective locations of each machine type communication (MTC) gateway that supports a capillary network;
  subsequently receive a trigger information message having the first device identity, the abbreviated device identity and a requested action; and
  cause a triggering message to be broadcast within the target area in accordance with the wake up information, wherein the triggering message includes the abbreviated device identity and the requested action.

14. An apparatus according to claim 13 wherein the processing circuitry is further configured to determine one or more base stations that communicate within the target area, and wherein the processing circuitry is configured to cause the triggering message to be broadcast by causing the one or more base stations to broadcast the triggering message within the target area.

15. An apparatus according to claim 13 wherein the processing circuitry is further configured to remove the first device identity from the trigger information message prior to causing the trigger message to be broadcast without the first device identity.

16. An apparatus according to claim 13 wherein the processing circuitry is configured to receive the trigger information message by receiving the trigger information message that also has an authentication field, and wherein the processing circuitry is configured to cause the triggering message to be broadcast by causing the triggering message to be broadcast that also includes the authentication field.

17. An apparatus according to claim 13 wherein the first device identity and the abbreviated device identity are configured to identify any one of a MTC gateway or another device within a capillary network supported by the MTC gateway.

18. An apparatus comprising processing circuitry configured at least to:
  cause a geographical target area message to be provided that includes a first device identity, an abbreviated device identity that is shorter than the first device identity, a target area and wake up information, wherein the target area corresponds to respective locations of each machine type communication (MTC) gateway that supports a capillary network; and
  subsequently cause a trigger information message to be provided that includes the first device identity, the abbreviated device identity and a requested action.

19. An apparatus according to claim 18 wherein the processing circuitry is configured to cause the trigger information message to be provided by causing the trigger information message to be provided that also includes an authentication field.

20. An apparatus according to claim 18 wherein the first device identity and the abbreviated device identity are configured to identify any one of a MTC gateway or another device within a capillary network supported by the MTC gateway.

* * * * *